US008985477B2

(12) United States Patent
Chan et al.

(10) Patent No.: US 8,985,477 B2
(45) Date of Patent: Mar. 24, 2015

(54) HIGH ALTITUDE PAYLOAD STRUCTURES AND RELATED METHODS

(75) Inventors: Alistair K. Chan, Stillwater, MN (US); Roderick A. Hyde, Redmond, WA (US); Nathan P. Myhrvold, Medina, WA (US); Clarence T. Tegreene, Bellevue, WA (US); Lowell L. Wood, Jr., Bellevue, WA (US)

(73) Assignee: The Invention Science Fund I LLC

( * ) Notice: Subject to any disclaimer, the term of this patent is extended or adjusted under 35 U.S.C. 154(b) by 2522 days.

(21) Appl. No.: 11/788,394

(22) Filed: Apr. 18, 2007

(65) Prior Publication Data

US 2008/0258013 A1    Oct. 23, 2008

(51) Int. Cl.
  *A01G 15/00* (2006.01)
  *E01H 13/00* (2006.01)
(52) U.S. Cl.
  CPC ...................................... *A01G 15/00* (2013.01)
  USPC .......................................................... 239/2.1
(58) Field of Classification Search
  USPC ................ 239/14.1; 454/1, 3, 8, 10; 110/184;
  244/24, 31
  See application file for complete search history.

(56) References Cited

U.S. PATENT DOCUMENTS

| | | | |
|---|---|---|---|
| 2,479,776 A | 8/1949 | Price | |
| 2,627,026 A | 1/1953 | Kandoian et al. | |
| 2,931,597 A * | 4/1960 | Moore, Jr. | 244/97 |
| 3,062,488 A * | 11/1962 | Sulger | 244/155 R |
| 3,086,753 A | 4/1963 | Cushman | |
| 3,489,072 A * | 1/1970 | Secor | 454/1 |
| 3,534,928 A | 10/1970 | Tanner | |
| 3,635,290 A * | 1/1972 | Schneider | 169/48 |
| 3,664,069 A | 5/1972 | Ikai et al. | |
| 3,748,867 A | 7/1973 | Bel Hamri | |
| 3,780,639 A | 12/1973 | Wood | |
| 3,918,518 A | 11/1975 | James | |
| 3,974,756 A | 8/1976 | Long | |
| 4,002,158 A | 1/1977 | Radebold | |

(Continued)

FOREIGN PATENT DOCUMENTS

CN    1402965 A    3/2003
DE   19518471 A1   1/1995

(Continued)

OTHER PUBLICATIONS

Bolonkin, Alexander; "Optimal Inflatable Space Towers with 3-100 km Height"; JBIS; bearing a date of 2003; pp. 87-97; vol. 56.

(Continued)

*Primary Examiner* — Justin Jonaitis

(57) ABSTRACT

A system and method is described generally for providing a high altitude structure including an elongated structure coupled to the ground and extending skyward. The elongated structure at least partially supported by buoyancy effects, the elongated structure including at least one lumen, the at least one lumen configured to transport at least one material and to vent the at least one material to the atmosphere. The system and method also include a gas having a density that is less dense than that of the atmosphere outside of the elongated structure; the gas is disposed in one or more voids of the elongated structure. The system and method includes the use of an introducer configured to provide the gas into the one or more voids. The system and method further include a payload coupled to the elongated structure and being held aloft by the elongated structure.

15 Claims, 9 Drawing Sheets

(56) References Cited

U.S. PATENT DOCUMENTS

| | | | |
|---|---|---|---|
| 4,704,732 | A | 11/1987 | Csonka |
| 4,936,198 | A | 6/1990 | de Mendoza Sans |
| 5,003,186 | A | 3/1991 | Chang et al. |
| 5,182,458 | A | 1/1993 | McConachy |
| 5,284,628 | A | 2/1994 | Prueitt |
| 5,295,625 | A | 3/1994 | Redford |
| 5,322,219 | A | 6/1994 | Esplin |
| 5,678,783 | A | 10/1997 | Wong |
| 6,241,160 | B1 * | 6/2001 | Redford ........................ 239/14.1 |
| 6,762,695 | B1 | 7/2004 | Eslambolchi et al. |
| 6,786,457 | B2 | 9/2004 | Dockter et al. |
| 7,354,877 | B2 | 4/2008 | Rosenberger et al. |
| 7,506,483 | B2 | 3/2009 | Thoeny |
| 7,601,234 | B2 | 10/2009 | St. Denis et al. |
| 7,694,486 | B2 | 4/2010 | Murphy et al. |
| 7,735,483 | B2 | 6/2010 | Papageorgiou |
| 2002/0167702 | A1 * | 11/2002 | Badesha et al. ............... 359/172 |
| 2004/0237458 | A1 | 12/2004 | Thiel et al. |
| 2005/0095938 | A1 | 5/2005 | Rosenberger et al. |
| 2006/0017809 | A1 | 1/2006 | Carroll |
| 2006/0272240 | A1 | 12/2006 | Papageorgiou |
| 2006/0283133 | A1 | 12/2006 | Westre et al. |

FOREIGN PATENT DOCUMENTS

| | | | |
|---|---|---|---|
| DE | 19518471 | A1 | 5/1995 |
| DE | 29622549 | U1 | 12/1996 |
| DE | 29622549 | U1 | 3/1997 |
| GB | 2404433 | A | 2/2005 |
| GB | 2419930 | A | 5/2006 |
| GR | 1004837 | B1 | 3/2004 |
| JP | 10070941 | A | 3/1998 |
| RU | 2105929 | C1 | 12/1998 |
| WO | WO 94/20710 | | 9/1994 |
| WO | WO 95/23499 | | 9/1995 |
| WO | WO 99/54572 | | 10/1999 |
| WO | WO 2004/036039 | A1 | 4/2004 |

OTHER PUBLICATIONS

Bolonkin, Alexander; "Optimal Solid Space Tower"; 45*th* AIAA Aerospace Science Meeting; Jan. 8-11, 2007; pp. 1-8; AIAA-2007-0367.

United Kingdom Patent Combined Search and Examination Report under Sections 17 & 18(3) (4 pages); UK App. No. 0806843.9; dated Jul. 7, 2008 and Jul. 8, 2008.

United Kingdom Patent Combined Search and Examination Report under Sections 17 & 18(3) (7 pages); UK App. No. 0806836.3; dated Aug. 6, 2008 and Aug. 7, 2008.

United Kingdom Patent Combined Search and Examination Report under Sections 17 and 18(3) (7 pages); UK App. No. 0806842.1; dated Aug. 1. 2008 and Aug. 4, 2008.

PCT International Search Report; International App. No.: PCT/US 08/04985; Sep. 2, 2008; pp. 1-2.

Bolonkin, Alexander; "Optimal Inflatable Space Towers with 3—100 km Height"; Journal of the British Interplanetary Society; bearing a date of 2003; pp. 87-97; vol. 56.

"Cloud seeding"; Wikipedia; bearing a date of Jan. 13, 2007; printed on Jan. 25, 2007; pp. 1-4; located at http://en.wikipedia.org/wiki/Cloud_seeding.

Glassman, Brian; "Jet Contrails and Global Warming , The Greenhouse Effect: Global Warming Facts and Future"; TechRD.com; bearing a date of Apr. 17, 2001; printed on Jan. 25, 2007; pp. 1-5; located at http://www.techrd.com/aviation-safety-links/jet-contrails-and-global-warming/.

Jaworski, Rick; "Carbon Dioxide Scrubbing Technology. A Solution to Global Warming?"; ZPEnergy.com; bearing dates of Aug. 7, 2006 and 2005; printed on Jan. 25, 2007; pp. 1-4; located at http://www.zpenergy.com/modules.php?name=News&file=article&thold=-1&mode=flat&order=0&sid=2000.

"Jet Contrails Alter Average Daily Temperature Range"; Sciene Daily; bearing dates of Aug. 8, 2002 and 1995-2007; printed on Jan. 25, 2007; pp. 1-3; Science Daily LLC; located at http://www.sciencedaily.com/release/2002/08/020808075457.htm.

Schlesinger, M. E.; Andronova, N.G.; Ghanem, A.; Malyshev, S.; Rozanov, E.; Wang, W.; Yang, F.; "Geographical Scenarios of Greenhouse-Gas and Anthropogenic-Sulfate-Aerosol Induced Climate Changes"; Environmental Horizons; printed on Jan. 25, 2007; pp. 1-3; located at http://crga.atmos.uiuc.edu/publications/horizons/geogscen.html.

Wood, Lowell Dr.; Geoengineering: Albedo Modulation Approaches to Preferred Climates as the Atmospheric $CO_2$ Level Rises Toward the "Agricultural Optimum"; Energy Modeling Forum's Workshop on Critical Issues in Climate Change, Snowmass, CO; bearing dates of Jul. 26, 2005-Aug. 4, 2005; pp. 1-37.

Wood, Lowell Dr.; "Geoengineering: Stabilizing Changing Climate Via Stratosphere-Based Albedo Modulation"; Nasa Ames Research Center-Carnegie Institution Workshop on Managing Solar Radiation, Moffett Field, CA; bearing dates of Nov. 18, 2006-Nov. 19, 2006; pp. 1-77.

Wood, Lowell Dr.; "Slamming on the Brakes: Abruptly Stabilizing Changing Global Climate Via Deep Albedo Modulation"; Energy Modeling Forum's Workshop on Abrupt and Catastrophic Climate Change, Snowmass, CO.; bearing dates of Jul. 24, 2006-Aug. 4, 2006; pp. 1-73.

UK Intellectual Property Office Examination Report Under Section 18(3); App. No.: GB0806843.9; Aug. 19, 2010; pp. 1-3.

UK Examination Report Under Section 18(3); App. No. GB0806843.9; bearing a date of Feb. 1, 2010 (received by our Agent on Feb. 8, 2010); pp. 1-3.

UK Intellectual Property Office Examination Report under Section 18(3); App. No. GB0919587.6; May 19, 2011 (Received by our agent Jun. 7, 2011); pp. 1-5.

UK Intellectual Property Office Examination Report under Section 18(3); Application No. GB0919587.6; date Sep. 16, 2011 (Received by our agent Sep. 21, 2011); pp. 1-3.

* cited by examiner

HIGH ALTITUDE PAYLOAD STRUCTURES AND RELATED METHODS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

1. For purposes of the USPTO extra-statutory requirements, the present application constitutes a continuation in part of currently co-pending United States patent application entitled HIGH ALTITUDE STRUCTURES AND RELATED METHODS, naming Alistair K. Chan, Roderick A. Hyde, Nathan P. Myhrvold, Lowell L. Wood, Jr., and Clarence T. Tegreene as inventors, as inventors, U.S. application Ser. No. 11/788,389, filed contemporaneously herewith.

2. For purposes of the USPTO extra-statutory requirements, the present application constitutes a continuation in part of currently co-pending United States patent application entitled HIGH ALTITUDE STRUCTURES CONTROL SYSTEM AND RELATED METHODS, naming Alistair K. Chan, Roderick A. Hyde, Nathan P. Myhrvold, Lowell L. Wood, Jr., and Clarence T. Tegreene as inventors, as inventors, U.S. application Ser. No. 11/788,372, filed contemporaneously herewith.

3. For purposes of the USPTO extra-statutory requirements, the present application constitutes a continuation in part of currently co-pending United States patent application entitled HIGH ALTITUDE ATMOSPHERIC ALTERATION SYSTEM AND METHOD, naming Alistair K. Chan, Roderick A. Hyde, Nathan P. Myhrvold, Lowell L. Wood, Jr., and Clarence T. Tegreene as inventors, as inventors, U.S. application Ser. No. 11/788,383, filed contemporaneously herewith.

BACKGROUND

The description herein generally relates to the field of high altitude structures capable of many applications as well as methods of making and using the same.

Conventionally, there is a need for high altitude structures for high altitude applications, such as but not limited to communications, weather monitoring, atmospheric management, venting, surveillance, entertainment, etc. Such needed high altitude structures may be configured to carry and support payloads at various altitudes.

SUMMARY

In one aspect, a method of providing a payload to an altitude includes coupling a payload to an elongated member, the elongated member coupled to the surface and extending skyward. The method also includes generating a lifting force by a carrier external to and coupled to the elongated member to aid in extending the elongated member into the atmosphere to a substantially high altitude.

In another aspect, a method of providing communications between two points includes receiving a communication signal by a transceiver held aloft by a high altitude structure in response to a communication signal being sent. The high altitude structure is held substantially upright at least partially by buoyant forces, the buoyant forces at least partially provided by a carrier external to and coupled to the high altitude structure and the high altitude structure is coupled to the surface and extends skyward. The method further includes transmitting by the transceiver a communication signal.

In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes a high altitude structure. The high altitude structure includes an elongated structure coupled to the ground and extending skyward, the elongated structure at least partially supported by buoyancy effects, the elongated structure including at least one lumen, the at least one lumen configured to transport at least one material and to vent the at least one material to the atmosphere. The system also includes a gas having a density that is less dense than that of the atmosphere outside of the elongated structure. The gas is disposed in one or more voids of the elongated structure. The system further includes an introducer configured to provide the gas into the one or more voids. Further still, the system includes a payload coupled to the elongated structure and being held aloft by the elongated structure.

In another aspect, a high altitude structure includes an elongated member formed of at least a first material coupled to the surface at at least one end. The high altitude structure also includes at least one carrier coupled to the elongated member and at least partially supporting the elongated member in a substantially upright orientation to a substantially high altitude. Further, the high altitude structure includes a payload coupled to the elongated member and being held aloft by the elongated member.

In yet another aspect, a high altitude structure includes an elongated member formed of at least a first material, the elongated member coupled to the surface. The structure also includes a buoyancy structure coupled to the elongated member and supporting the elongated member in a substantially upright orientation reaching to a substantially high altitude. The structure further includes a platform coupled to the elongated member and being held aloft by the elongated member.

In yet still another aspect, a high altitude structure includes a base and an elongated member coupled to the base. The structure also includes an orbital anchor in orbit about the earth and a tether coupled to the elongated member and to the orbital anchor, the tether at least partially supporting the elongated member. A payload is coupled to the elongated member and is held aloft by the elongated member.

In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

The foregoing summary is illustrative only and is not intended to be in any way limiting. In addition to the illustrative aspects, embodiments, and features described above, further aspects, embodiments, and features will become apparent by reference to the drawings and the following detailed description, of which.

DETAILED DESCRIPTION

Figure 1:
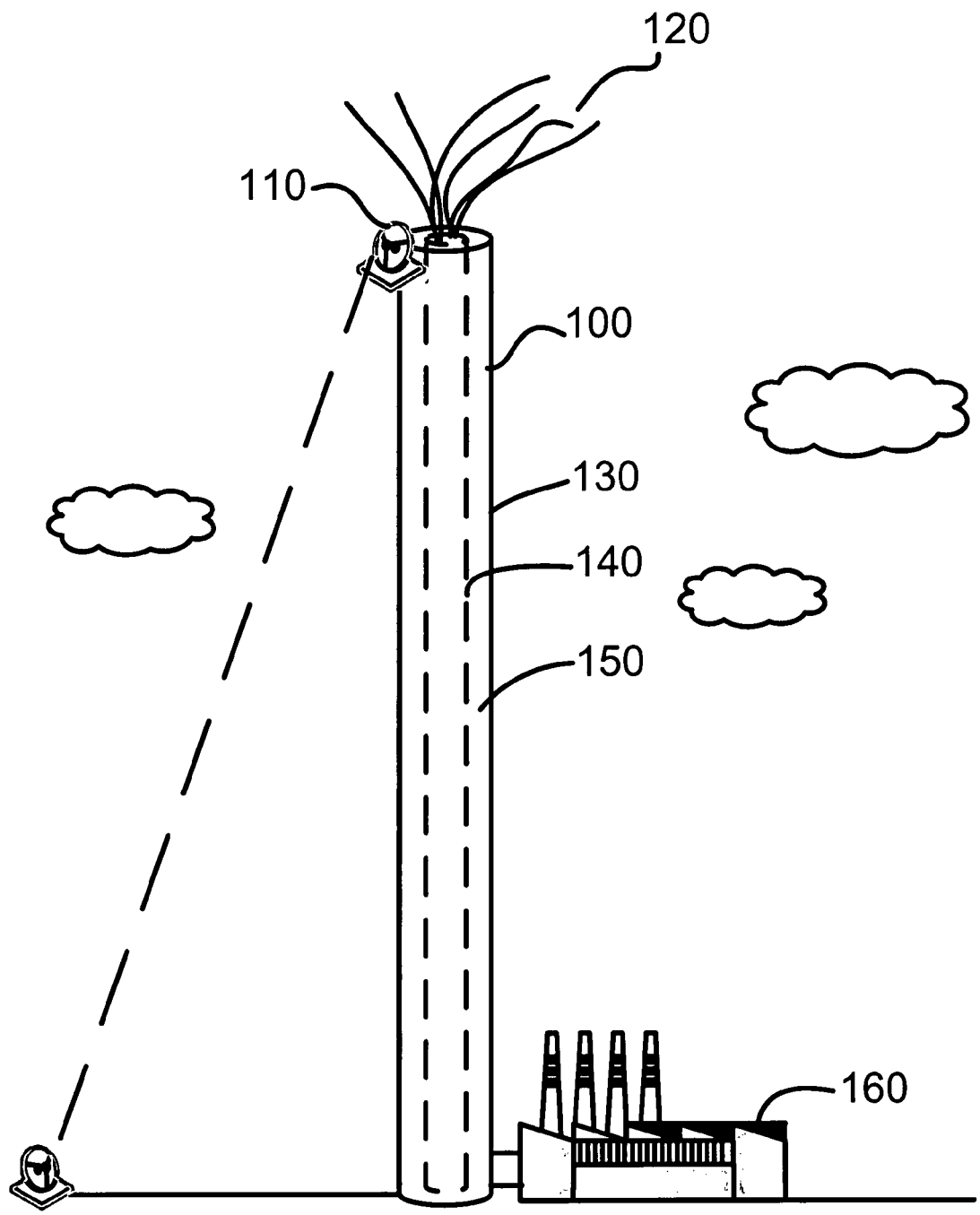
FIG. 1 is an exemplary diagram of a generalized high altitude conduit.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Referring now to FIG. 1, a high-altitude structure 100 is depicted. High altitude structure 100 includes but is not limited to any of a variety of materials which may be relatively lightweight, strong, and be capable of standing aloft in a variety of atmospheric, weather-related, and heating conditions. Further, structure 100 may be capable of being applied in a variety of environments and for a variety of applications. Structure 100 may be used in a variety of ways including as a supporting structure for equipment, such as but not limited to antenna 110, as a vent for exhaust gases 120, or as a particulate or gas introducer, or the like. In the exemplary embodiment depicted in FIG. 1, structure 100 is an approximately cylindrical shape forming an elongated cannula having an exterior wall 130 surrounding an interior wall 140. In a particular exemplary embodiment a void 150 may be formed between exterior wall 130 and interior wall 140. The structure may be supported by introducing a gas into void 150 which may be lighter than the ambient air surrounding the structure. Gas introduced into void 150 may come from any of a variety of sources. In a particular exemplary embodiment, gas may come from a manufacturing facility 160 where gas may be manufactured for the purpose of supporting conduit 150 or the gas may be exhaust gasses from a manufacturing process at facility 160. In accordance with alternative embodiments, the structure of the voids and conduits may vary and may include any number of and combination of voids and conduits. Also, material flow in the voids and conduits may be controlled. In an alternative embodiment, there may be interconnections between the voids and conduits such that material flow may be created between the voids and conduits and/or between voids and/or between conduits. Although specific shapes, cross sections, and relative dimensions of the voids and conduits are depicted, the embodiments are not limited but may be made in any of a variety of shapes, cross sections, and relative dimensions. Further, the shapes, sizes, materials, relative dimensions, etc., may vary by location on the structure or alternatively may be varied in time. In an exemplary embodiment, the material flow may come from any of a variety of sources, including but not limited to a reservoir, a storage container, the atmosphere, an exhaust or waste material flow, etc.

High altitude conduit 100 is a conduit which may exceed the height of chimneys and like structures which are built from conventional building materials like concrete, steel, glass, wood, etc. which carry considerable weight. In one exemplary embodiment conduit 100 may reach higher than one kilometer above its base. In other exemplary embodiments the conduit may be formed to reach much greater heights. For example, referring to FIG. 5, a conduit 500 is depicted. Conduit 500 extends to high altitudes. In an exemplary embodiment, conduit 500 extends into the stratosphere (approximately 15 km to 50 km above sea level). In other exemplary embodiments conduit 500 may extend to other altitudes above or below the stratosphere. In exemplary embodiments, high altitude conduit 100 may be coupled at its base end to the surface of the earth or other planet. The surface may include but is not limited to the ground, on the water, above the ground on a supporting structure, underground, underwater, and the like.

Figure 2:
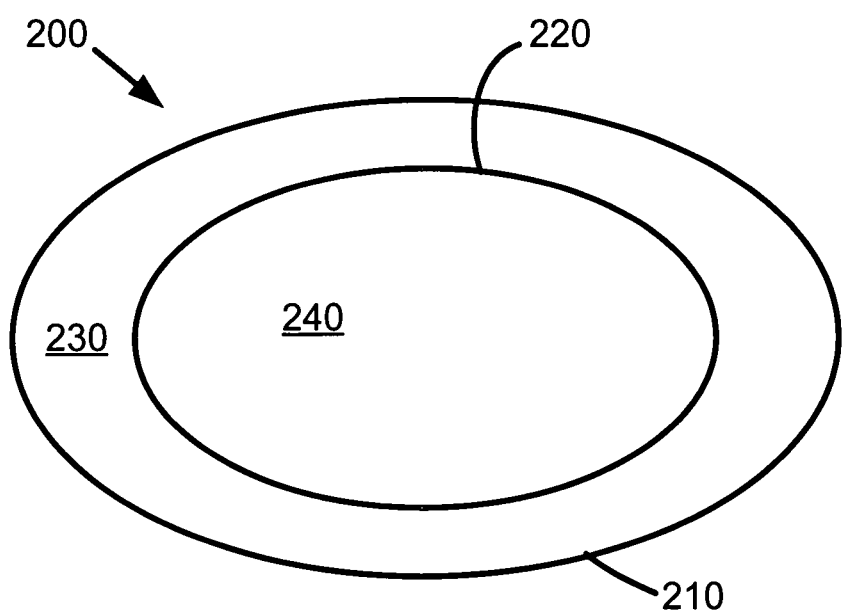
FIG. 2 is an exemplary diagram of a cross sectional configuration of a high-altitude conduit.

Referring now to FIG. 2, a cross section of an exemplary high altitude conduit 200 is depicted high altitude conduit 200 includes a first outer material layer 210 and a second interior material layer 220. The two material layers form a space 230 or void between the two layers. In one exemplary embodiment, space 230 may be filled with a gas that is lighter than the surrounding atmospheric air. The gas may provide buoyancy to the conduit. The gas in space 230 may also be provided under pressure such that it helps to maintain the shape of conduit 200. Gas in space 230 may be vented in a variety of manners including but not limited to through seams, vents, and holes, etc. The gas may be provided to conduit 200 by an introducer which may be in any of a variety of forms, including, but not limited to an exhaust outlet from a manufacturing facility or other industrial business, an outlet from a gas tank or other gas producing device, etc. In an exemplary embodiment interior material layer 220 forms an elongated tube or cannula having an interior lumen 240. Interior lumen 240 may be used for a variety of purposes including but not limited to providing gasses and/or particulate to the atmosphere at a given altitude, providing an outlet for exhaust gasses at a given altitude. Thus, conduit 200 may be used as a high atmospheric chimney for a manufacturing plant. Alternatively conduit 200 may be used to provide gasses and particulate into the atmosphere in an attempt to influence global warming or global cooling. It has been shown that certain gasses and/or particulate in the air may reflect incoming sunlight thereby reducing the amount of heat absorbed by the earth. Also, it has been shown that certain other gasses and/or particulate in the air may tend to trap heat close to the Earth's surface, thereby increasing the amount of heat absorbed by the Earth. By controlling the amount and type of gasses and/or particulate placed into the atmosphere, it may be possible to control to some extent the heating of the Earth. Delivery of such gasses and/or particulate may be provided by the use of high altitude conduit systems, such as are described here.

In accordance with other exemplary embodiments, the gas used to support conduit 100 of FIG. 1 may be any of a large variety of gasses including but not limited to hydrogen gas, helium gas, heated gas, exhaust gasses, etc. The introducer of the gas into the void for supporting conduit 100 may function to not only provide the gas but may also be used to pressurize the gas. Referring to FIG. 2, in one exemplary embodiment void 230 may be closed at the top of the conduit by a cap or sheet of material which substantially couples material layer 210 to material layer 220. In one exemplary form, the cap or sheet of material may include one or more holes that act as vents for the void 230. It should however be noted that any of a large variety of methods and structures may be used to support conduit 100 and further that conduit 100 which is depicted in FIG. 1 as a conduit may be representative of any of a variety of high altitude structures not limited to conduits.

Figure 3:
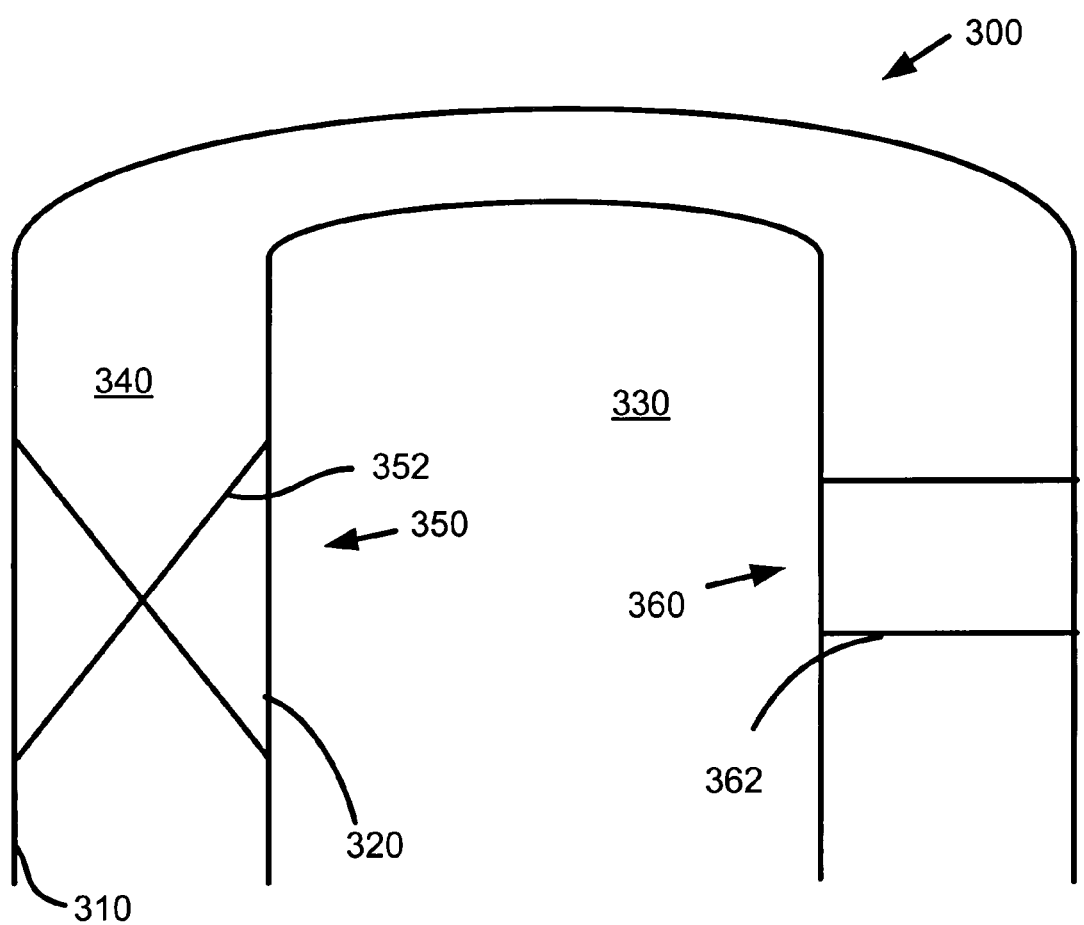
FIG. 3 is an exemplary diagram of a cross sectional configuration of a high-altitude conduit showing supporting elements.

Referring now to FIG. 3, a cross section of a conduit 300 is depicted. Conduit 330 includes an outer material layer 310, and an inner material layer 320. Inner material layer 320 forms an annular or other closed shape to form a lumen 330. In an exemplary embodiment, a void 340 is defined by outer layer 310 and inner layer 320. In an exemplary embodiment, because conduit 300 may be of a very elongated shape and may be formed from lightweight materials, a reinforcement or support structure may be needed to give conduit 300 at least one of shape and strength. In one exemplary embodiment, the reinforcement structure may include supporting elements coupled to at least one of outer layer 310 or inner layer 320. For example, FIG. 3 depicts exemplary supporting structures 350 and 360. Supporting elements 350 may be cross braces formed of a lightweight material including but not limited to metals and metal alloys, composites, and plastics. In one exemplary embodiment, the materials used for the supporting rib structures may be the same as those used for the conduit albeit in different shape and form. Structure 350 is depicted having cross braces 352 that extend between and are coupled to the inner and outer layers 310 and 320. In another exemplary embodiment the support structure 360 may comprise radially extending braces 362. Further other supporting configurations may be used, such as but not limited to annular ring structures coupled to at least one of outer layer 310 and inner layer 320, lengthwise rib structures, helical rib structures, etc. Any of a variety of support structures may be used to help maintain a substantially upright orientation of structure 300 and further to support payloads which may be coupled thereto.

Conduit 100 and like conduits may be formed of any of a variety of relatively strong and lightweight materials, including but not limited to Mylar, ripstop nylon, Zylon, nanomaterials, latex, Chloroprene, plastic film, polyester fiber, etc. Other materials may similarly be used. Further materials may be combined in various combinations in order to achieve the performance characteristics required and desired. Conduit 100 may be formed of multiple layers of material and may include thermal insulation and the like.

Figure 4:
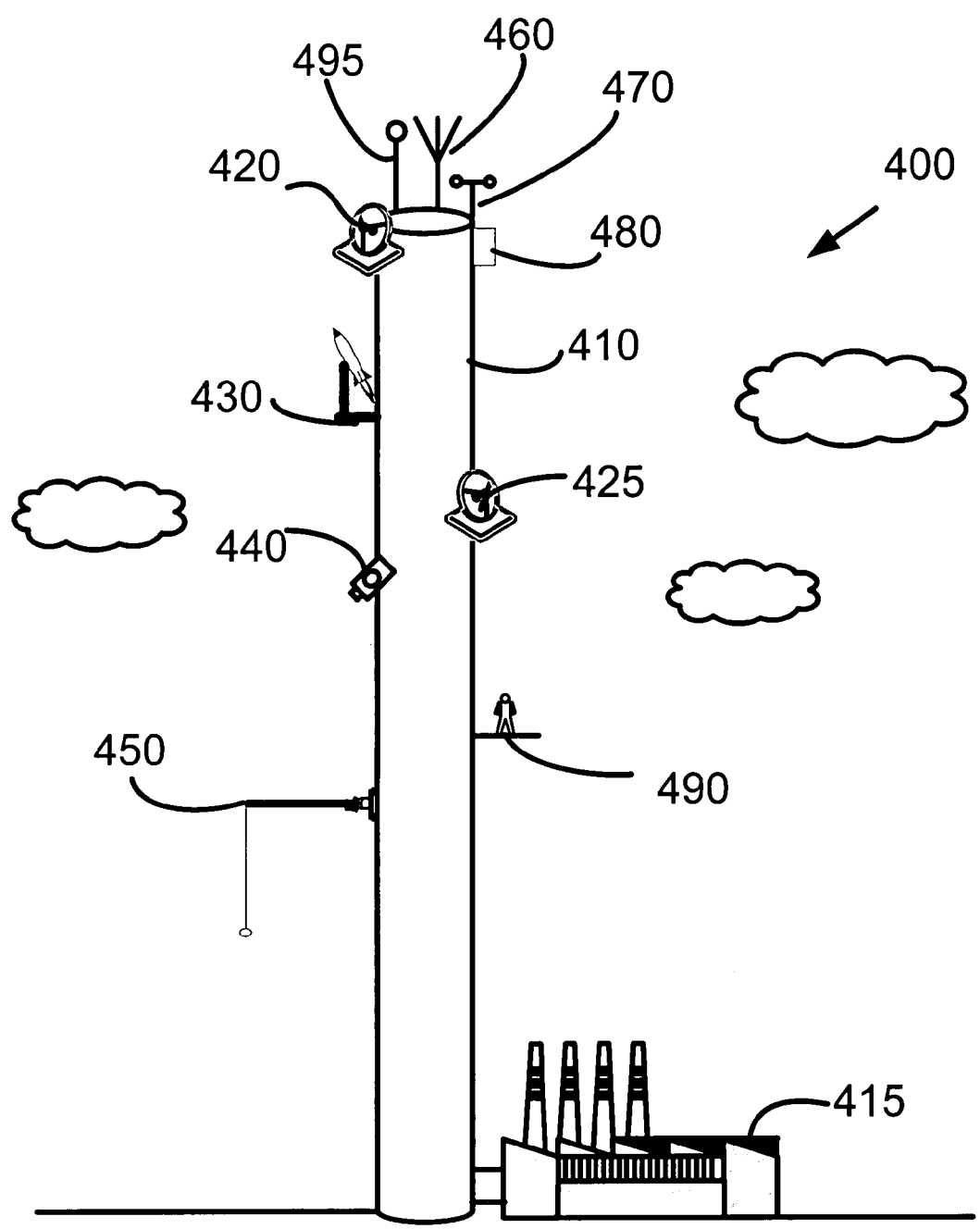
FIG. 4 is an exemplary diagram of a configuration of a high altitude supporting structure having payloads coupled thereto.

Referring now to FIG. 4, an exemplary embodiment of a support structure 400 is depicted. Support structure 400 may be a conduit, a tube, a lightweight material structure, a filamentary structure, a ribbon-like structure and the like. In one exemplary embodiment, support structure 400 comprises a tube having an outer wall 410. Support structure 400 has an introducer which provides lighter than atmosphere gasses to the interior of the tube. The gas may be any of the variety of gasses which may provide buoyancy of the structure, as discussed above. Further, the support structure may include but is not limited to any of a variety of supporting structures and supporting members as discussed with regard to FIG. 3. Although the tube form of support structure 400 is depicted, any of a variety of structure configurations may be used without departing from the scope of the invention. In accordance with an exemplary embodiment support structure 400 may be used to support any of a variety of equipment at any altitude up to relatively high altitudes near the top of support structure 400. For example, support structure 400 may support communications equipment such as but not limited to satellite dishes 420 and 425, microwave dishes, repeaters, transceivers, antennas 460 (radio, voice communication, cellular telephone, television, video, data, etc.), routers, etc. which may benefit from being at a chosen altitude. Also, in accordance with an exemplary embodiment support structure 400 may be used to support launching equipment and/or a launching platform 430. Such a platform may be used to launch aircraft, spacecraft, both powered and unpowered, which may benefit by being at high altitude. The craft launched may include both manned and unmanned vehicles. Further, craft launched may be for the purpose of launching satellites, launching gliders, launching balloons, launching missiles and projectiles, etc. Further still launching platform 430 may be used to launch weaponry such as but not limited to guns, lasers, sonic weaponry, bombs, etc.

In accordance with another exemplary embodiment, support structure 410 may be used to support surveillance equipment such as but not limited to a camera 440 (still or video). Further, other surveillance equipment may be used including cameras sensitive to other wavelengths of light beyond the visible spectrum, audio listening equipment and other electromagnetic radiation sensing equipment, and the like. Camera 440 may have other uses beyond surveillance including but not limited to weather imaging, art photography and videography, scientific observations, news reporting, and the like. In accordance with yet another exemplary embodiment, lifting equipment such as but not limited to hoist 450 may be coupled to and supported, at least partially, by support structure 410. Hoist 450 may be used to carry any of a variety of payloads including but not limited to construction payloads and freight payloads. Because of the potential height above the ground of hoist 450, hoist 450 may be embodied as a crane for use in constructing structures, such as but not limited to buildings, for example skyscrapers, and other structures. Hoist 450 may also be used to deliver certain goods to other platforms on support structure 410.

In yet another exemplary embodiment, support structure 410 may be used for weather monitoring. For example, weather monitoring equipment 470 may be mounted to support structure 410. Also other sensors 480 may be mounted to support structure 410 some of which may be used for atmospheric monitoring while others may be used for other monitoring and control applications such as but not limited to motion control of support structure 410, scientific monitoring for research purposes, monitoring of climatic changes, astronomical monitoring, atmospheric monitoring, remote ground or ocean monitoring, and the like.

In yet a further exemplary embodiment a platform 490 for people or other objects or devices may be supported by support structure 410. Platform 490 may be used for any of a variety of purposes including but not limited to recreational purposes. For example, platform 490 may be used as an observation platform, for a launching platform for activities such as but not limited to parachuting, skydiving, base jumping, hang gliding, gliding, etc.

In yet still a further exemplary embodiment, support structure 410 may include but is not limited to a beacon 495 such as but not limited to an aircraft guidance beacon, a location beacon or location identification signal source, an aircraft avoidance system beacon such as for an ADS-B or TCAS system, and the like. Alternatively, beacon 495 may be a light source as to help aircraft collision avoidance with support structure 410.

In alternative embodiments any combination of devices, structures, platforms, etc. may be mounted at any location along the length of support structure 410 without departing from the scope of the invention. As well, other supported elements may be coupled to support structure 410 other than those depicted.

Figure 5:
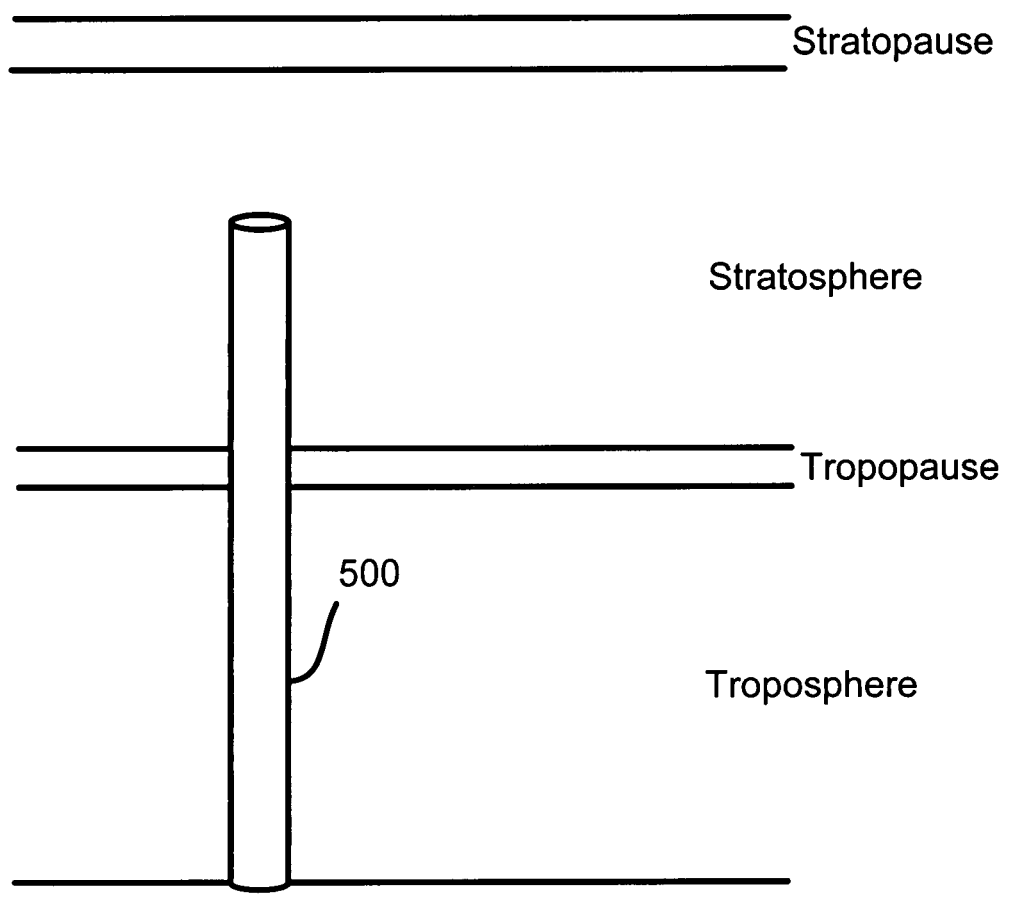
FIG. 5 is an exemplary diagram of a high altitude conduit depicting potential height thereof.

Referring now to FIG. 5, a high altitude conduit 500 is depicted. Conduit 500 is depicted as extending into the stratosphere. Typically, the tropopause which transitions the atmosphere to the stratosphere occurs at approximately 15 kilometers above sea level. The stratopause, which defines the upper boundary of the stratosphere occurs at approximately 50 kilometers above sea level. In accordance with an exemplary embodiment, as shown conduit 500 extends into the stratosphere. Although facility may be provided by having conduit 500 extending into the stratosphere, other heights of conduit 500 may be useful as well. For example, it may be desirable to have a conduit extend at almost any height within the troposphere. It may also be useful to have conduits which extend beyond the stratosphere. Because of the extremely high altitudes which may be reached by structure 500, any of a variety of payloads which would benefit from being at such high altitudes, without being aboard a conventional aircraft, may be desirable to couple to structure 500.

Figure 6:
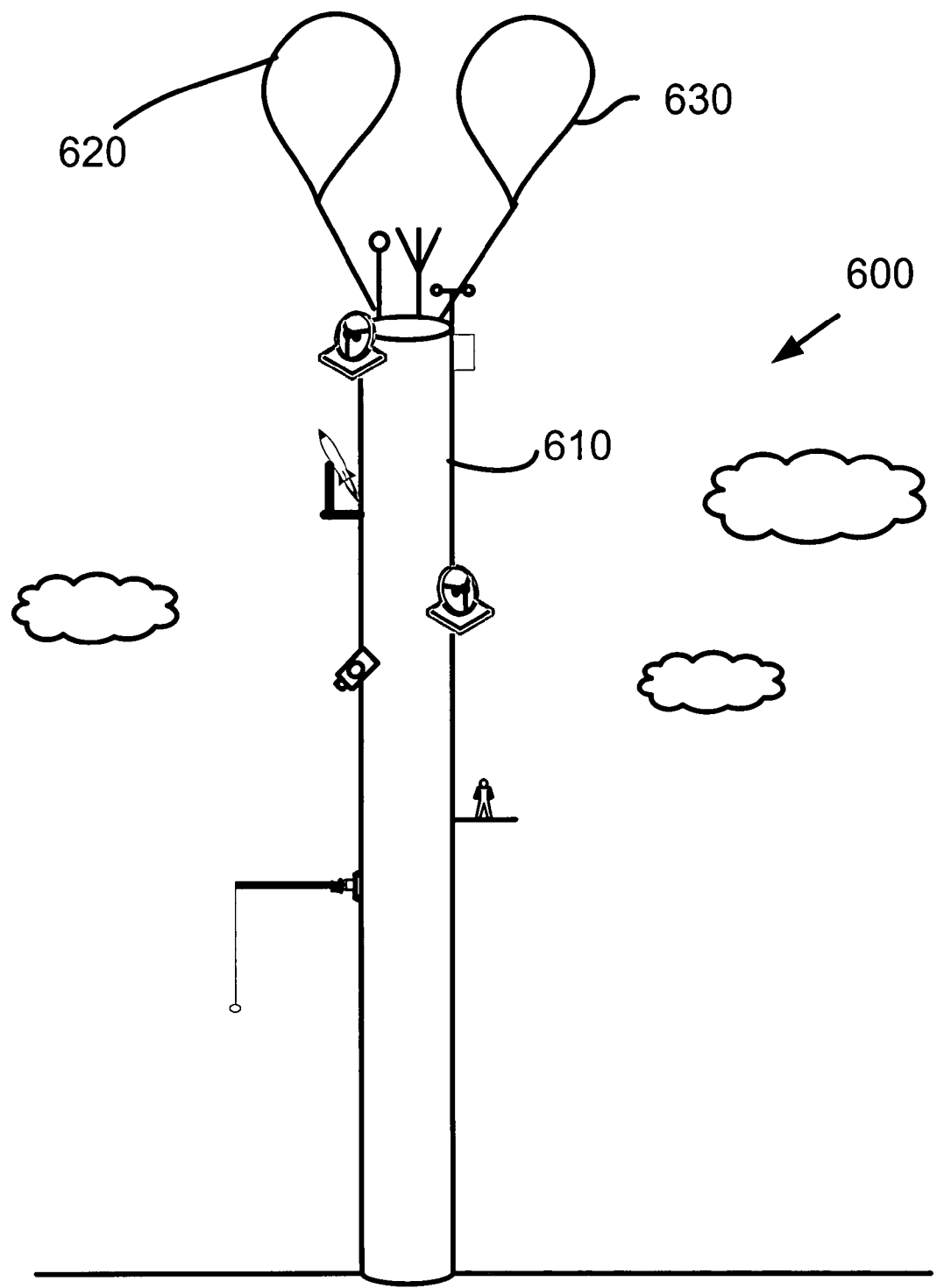
FIG. 6 is an exemplary diagram of a high altitude supporting structure with a carrier attached thereto.

Referring now to FIG. 6, an exemplary embodiment of a support structure 600 is depicted. Support structure 600 may comprise a layer 610 which defines an elongated structure. Support structure 600 may be held aloft by one or more balloons 620 and 630 or other devices used to maintain support structure 600 in an upright position. Other such devices may include but are not limited to airfoils, parafoils, and kites or other aerodynamic lifting surfaces, propellers, rockets, and jets or other thrust providing devices. Yet other structures for keeping support structure 600 aloft includes the use of an orbital anchor and tether combination (see FIG. 9). Yet other structures for keeping support structure 600 aloft include momentum coupling to a vertically moving mass stream, such as but not limited to electric or magnetic coupling to moving projectiles or drag or thrust coupling to gas or liquid flows. Further, support structure 600 may be a double walled conduit as discussed earlier which provides additional buoyancy in combination with balloons or other lifting devices.

In an exemplary embodiment the carrier such as balloons 620 and 630 contain Hydrogen gas, Helium gas, heated gas, an exhaust gas, or other lighter than atmospheric air gas. In an exemplary embodiment an introducer pressurizes the gas into a space in the one or more carrier. This pressurized gas may be carried from ground level through a tube or the like.

Figure 7:
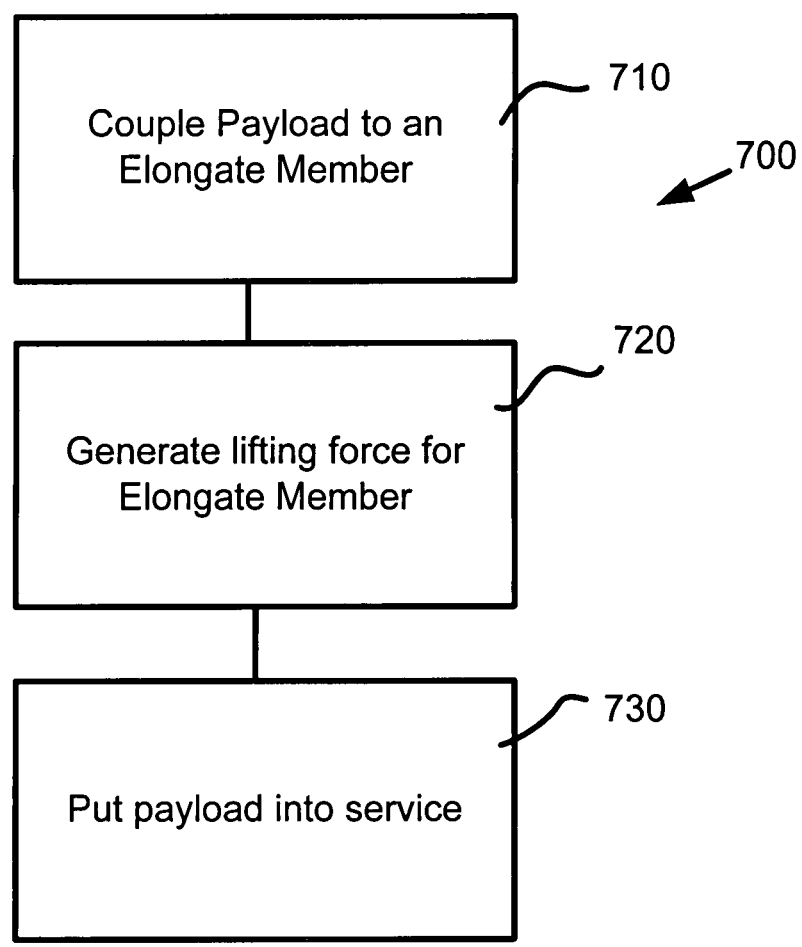
FIG. 7 is an exemplary diagram of a payload lifting process.

Referring now to FIG. 7, a process 700 of providing a payload to an altitude includes coupling a payload to an elongate member (process 710). The payload may be any of a variety of payloads as earlier discussed. Process 700 also includes generating a lifting force for the elongate member to extend the elongate member into the atmosphere (process 720). The lifting force may be generated by any of a variety of systems and devise as discussed earlier. Further, process 700 may include putting the payload into service and/or taking the payload out of service.

Figure 8:
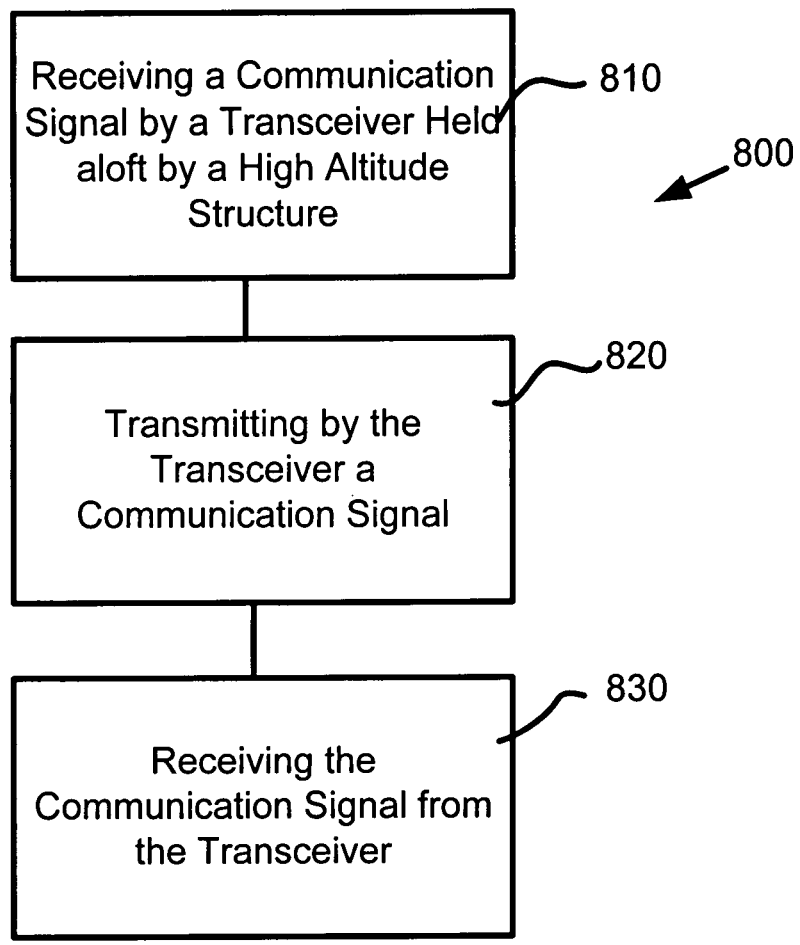
FIG. 8 is an exemplary diagram of a communication process.

Referring now to FIG. 8, a process 800 of providing communications between two points is depicted. Process 800 includes receiving a communication signal by a transceiver held aloft by a high altitude structure in response to a communication signal being sent (process 810). The high altitude structure is then held substantially upright by buoyant forces. The transceiver transmits a communication signal (process 820). The transmitted communication signal may then received by a receiver (process 830).

Figure 9:
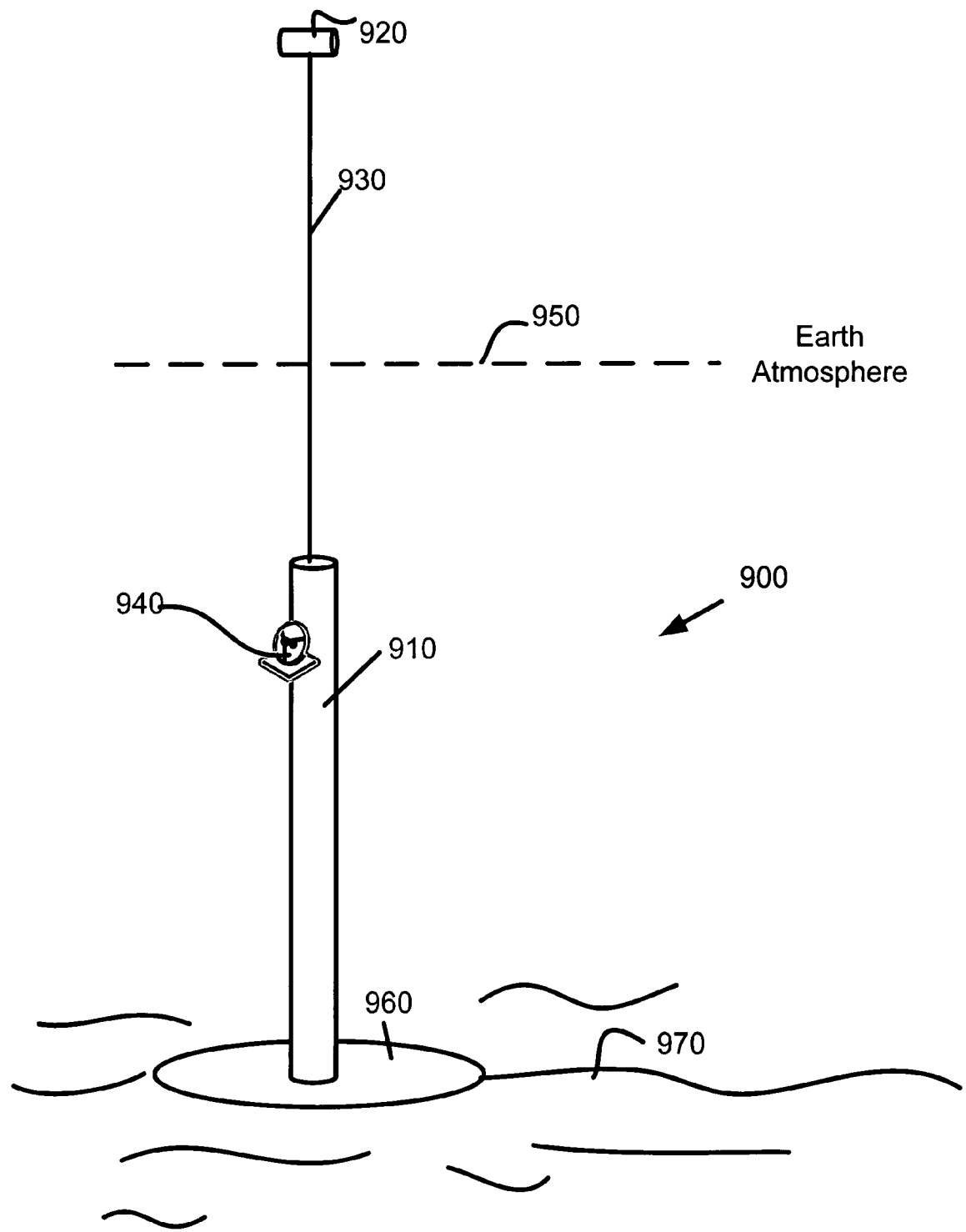
FIG. 9 is an exemplary diagram of a high altitude structure being supported by an orbital anchor.

Referring now to FIG. 9, a high altitude structure 900 is depicted. High altitude structure 900 is formed of a material 910 that extends in a substatially upward direction. An orbital anchor (satellite or other orbiting body) supports material 910 by a tether 930 coupled between material 910 and orbital anchor 920. In an exemplary embodiment, anchor 920 is, while anchored via tether 930 to material 910, in a geosynchronus orbit (powered or unpowered and controlled or uncontrolled) about the earth or other planetary body. The geosynchronus orbit would be outside of the majority of earth's atmosphere represented by line 950. In an exemplary embodiment, a payload 940 (such as communication gear or any of a variety of payloads) is supported by the high altitude structure. Tether 930 may be formed of any of a variety of materials having a high strength to weight ratio including but not limited to carbon nanotube fibers or other nanomaterials. A base 960 of structure 900 may be supported on the ground, underground, underwater, in the air or, as depicted floating on a body of water 970. Allowing the base 960 to move may make it easier to control the top of the structure 900 as variance of tension of the tether 930 may occur. Also having the ability to have the base movable may be advantageous in allowing less stress on the structure itself.

In another exemplary embodiment, supporting electronics are coupled to the upstanding high altitude structure such that they may be supported in the atmosphere at an altitude. Such electronics may include but are not limited to communications equipment, sensors, weather forecasting equipment, testing and sampling equipment, surveillance equipment, etc. In accordance with another exemplary embodiment, control equipment may be coupled to one or more positions along the high altitude structure. Such control equipment may be used to keep and/or place the high altitude structure at a desired position and/or move the conduit to a desired position.

In a general sense, those skilled in the art will recognize that the various embodiments described herein can be implemented, individually and/or collectively, by various types of electromechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electromechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electromechanical systems include but are not limited to a variety of consumer electronics systems, as well as other systems such as motorized transport systems, factory automation systems, security systems, and communication/computing systems. Those skilled in the art will recognize that electromechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, hovercraft, helicopter, etc.) , (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc), or (g) a wired/wireless services entity such as Sprint, Cingular, Nextel, etc.), etc.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of providing a payload to an altitude, comprising:
    coupling a payload to and adjacent an elongated member, the elongated member coupled to the surface of the Earth and extending skyward from the surface of the Earth; and
    generating a lifting force by a carrier external to and coupled to the elongated member to aid in extending the elongated member into the atmosphere to a substantially high altitude; and
    wherein the payload comprises more than one device, each device being at a different altitude along the elongated member.

2. The method of claim 1, wherein the elongated member extends at least one kilometer into the atmosphere.

3. The method of claim 1, wherein the elongated member extends at least 10 kilometers into the atmosphere.

4. The method of claim 1, wherein the elongated member extends into the stratosphere.

5. The method of claim 1, further comprising:
    changing position of the payload on the elongated member.

6. The method of claim 1, further comprising:
    releasing the payload from the elongated member.

7. The method of claim 1, wherein the payload is coupled to a cable.

8. The method of claim 1, wherein the payload is coupled to the elongate member via an intermediate structure between the payload and the elongate member.

9. The method of claim 1, wherein the payload comprises an electromagnetic transmitter.

10. A method of providing a payload to an altitude, comprising:
- coupling a payload to and adjacent an elongated member, the elongated member coupled to the surface of the Earth and extending skyward from the surface of the Earth;
- generating a lifting force by a carrier external to and coupled to the elongated member to aid in extending the elongated member into the atmosphere to a substantially high altitude; and
- venting at least one material to the atmosphere through at least one lumen coupled to or integrated with the elongated member.

11. A method of providing a payload to an altitude, comprising:
- coupling a payload to and adjacent an elongated member, the elongated member coupled to the surface of the Earth and extending skyward from the surface of the Earth; and
- generating a lifting force by a carrier external to and coupled to the elongated member to aid in extending the elongated member into the atmosphere to a substantially high altitude,
- wherein the carrier comprises more than one buoyant object.

12. A method of providing a payload to an altitude, comprising:
- coupling a payload to and adjacent an elongated member, the elongated member coupled to the surface of the Earth and extending skyward from the surface of the Earth; and
- generating a lifting force by a carrier external to and coupled to the elongated member to aid in extending the elongated member into the atmosphere to a substantially high altitude,
- wherein the carrier comprises at least one lifting surface.

13. A method of providing a payload to an altitude, comprising:
- coupling a payload to and adjacent an elongated member, the elongated member coupled to the surface of the Earth and extending skyward from the surface of the Earth; and
- generating a lifting force by a carrier external to and coupled to the elongated member to aid in extending the elongated member into the atmosphere to a substantially high altitude,
- wherein the carrier comprises an orbital anchor.

14. A method of providing a payload to an altitude, comprising:
- coupling a payload to and adjacent an elongated member, the elongated member coupled to the surface of the Earth and extending skyward from the surface of the Earth; and
- generating a lifting force by a carrier external to and coupled to the elongated member to aid in extending the elongated member into the atmosphere to a substantially high altitude,
- attaching the payload to the elongated member.

15. A method of providing a payload to an altitude, comprising:
- coupling a payload to and adjacent an elongated member, the elongated member coupled to the surface of the Earth and extending skyward from the surface of the Earth; and
- generating a lifting force by a carrier external to and coupled to the elongated member to aid in extending the elongated member into the atmosphere to a substantially high altitude,
- wherein the payload is an external surface that is at least partially supported by the elongate member.

* * * * *